US010620634B2

(12) United States Patent
Tschanz et al.

(10) Patent No.: US 10,620,634 B2
(45) Date of Patent: Apr. 14, 2020

(54) VEHICLE INTERFACE FOR AUTONOMOUS VEHICLE

(71) Applicant: UATC, LLC, San Francisco, CA (US)

(72) Inventors: Frederic Tschanz, Pittsburgh, PA (US); Aaron L. Greenfield, Pittsburgh, PA (US); Diana Yanakiev, Birmingham, MI (US); Dillon Collins, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 181 days.

(21) Appl. No.: 15/718,003

(22) Filed: Sep. 28, 2017

(65) Prior Publication Data

US 2019/0064825 A1   Feb. 28, 2019

Related U.S. Application Data (60) Provisional application No. 62/549,024, filed on Aug. 23, 2017.

(51) Int. Cl.
| | | |
|---|---|---|
| *G05D 1/02* | (2020.01) | |
| *B60W 30/09* | (2012.01) | |
| *G05D 1/00* | (2006.01) | |
| *G01C 21/34* | (2006.01) | |
| *B60W 50/00* | (2006.01) | |

(52) U.S. Cl.
CPC .......... *G05D 1/0212* (2013.01); *B60W 30/09* (2013.01); *B60W 50/00* (2013.01); *G01C 21/3407* (2013.01); *G01C 21/3415* (2013.01); *G05D 1/0088* (2013.01); *G05D 1/0214* (2013.01); *G05D 2201/0213* (2013.01)

(58) Field of Classification Search
CPC .... G05D 1/0212; B60W 30/09; B60W 50/00; G01C 21/3407
See application file for complete search history.

(56) References Cited

U.S. PATENT DOCUMENTS

| | | |
|---|---|---|
| 9,645,557 B2 | 5/2017 | Gill et al. |
| 2015/0251664 A1 | 9/2015 | Zagorski |
| 2017/0199523 A1 | 7/2017 | Barton-Sweeny et al. |

FOREIGN PATENT DOCUMENTS

WO    WO2017053357    3/2017

OTHER PUBLICATIONS

PCT International Search Report and Written Opinion for corresponding PCT Application No. PCT/US2018/042247, dated Oct. 8, 2018, 16 pages.

*Primary Examiner* — Michael D Lang
(74) *Attorney, Agent, or Firm* — Dority & Manning, PA (57) ABSTRACT

The present disclosure provides a vehicle interface for an autonomous vehicle. In particular, the systems and methods of the present disclosure can, responsive to receiving, from an autonomy computing system of an autonomous vehicle, a time-based trajectory for the autonomous vehicle, verify that execution of the time-based trajectory is within parameters of the autonomous vehicle. Responsive to verifying that execution of the time-based trajectory is within the parameters of the autonomous vehicle, the time-based trajectory can be converted into a spatial path for the autonomous vehicle, and one or more controls of the autonomous vehicle can be interfaced with such that the autonomous vehicle tracks the spatial path.

15 Claims, 5 Drawing Sheets

VEHICLE INTERFACE FOR AUTONOMOUS VEHICLE

PRIORITY CLAIM

This application claims priority to U.S. Patent Application Ser. No. 62/549,024, filed Aug. 23, 2017, and entitled "VEHICLE INTERFACE FOR AUTONOMOUS VEHICLE," the disclosure of which is incorporated by reference herein in its entirety.

FIELD

The present disclosure relates generally to autonomous vehicles. More particularly, the present disclosure relates to a vehicle interface for an autonomous vehicle.

BACKGROUND

An autonomous vehicle is a vehicle that is capable of sensing its environment and navigating with minimal or no human input. In particular, an autonomous vehicle can observe its surrounding environment using a variety of sensors and identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to operate an autonomous vehicle. The method can include, responsive to receiving, from an autonomy computing system of an autonomous vehicle, a time-based trajectory for the autonomous vehicle, verifying that execution of the time-based trajectory is within parameters of the autonomous vehicle. The method can include, responsive to verifying that execution of the time-based trajectory is within the parameters of the autonomous vehicle: converting the time-based trajectory into a spatial path for the autonomous vehicle; and interfacing with one or more controls of the autonomous vehicle such that the autonomous vehicle tracks the spatial path.

Another example aspect of the present disclosure is directed to a vehicle controller. The vehicle controller can comprise circuitry configured to, responsive to receiving, from an autonomy computing system of an autonomous vehicle, a time-based trajectory for the autonomous vehicle, verify that execution of the time-based trajectory is within parameters of the autonomous vehicle. The circuitry can be configured to, responsive to verifying that execution of the time-based trajectory is within the parameters of the autonomous vehicle: convert the time-based trajectory into a spatial path for the autonomous vehicle; interface with one or more controls of the autonomous vehicle such that the autonomous vehicle tracks the spatial path; and, responsive to determining a change in conditions of the autonomous vehicle, modify one or more of a longitudinal or lateral force of the autonomous vehicle.

Another example aspect of the present disclosure is directed to an autonomous vehicle. The autonomous vehicle can comprise circuitry configured to, responsive to receiving, from an autonomy computing system of an autonomous vehicle, a time-based trajectory for the autonomous vehicle, verify that execution of the time-based trajectory is within parameters of the autonomous vehicle. The circuitry can be configured to, responsive to verifying that execution of the time-based trajectory is within the parameters of the autonomous vehicle: convert the time-based trajectory into a spatial path for the autonomous vehicle; interface with one or more controls of the autonomous vehicle such that the autonomous vehicle tracks the spatial path; and communicate, to the autonomy computing system of the autonomous vehicle, a change in conditions of the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Generally, the present disclosure is directed to methods and systems for operating an autonomous vehicle. For example, an autonomous vehicle can include a vehicle interface module. The vehicle interface module can interface an autonomy computing system of the autonomous vehicle with one or more other vehicle controls of the autonomous vehicle. The autonomy computing system can be configured to determine (e.g., based on map and sensor data) time-based trajectories for the autonomous vehicle. These trajectories can be communicated to the vehicle interface module. The vehicle interface module can receive these trajectories and verify that execution of the trajectories is within parameters of the autonomous vehicle. For example, the vehicle interface module can determine whether the autonomous vehicle is capable of navigating along a time-based trajectory based on the capabilities of the autonomous vehicle in its current state. Responsive to verifying that the autonomous vehicle is capable of executing a time-based trajectory, the vehicle interface module can convert the time-based trajectory into a spatial path for the autonomous vehicle and can interface with one or more controls of the autonomous vehicle such that the autonomous vehicle tracks the spatial path. For example, the vehicle interface module can interface with low-level controls or actuators of the autonomous vehicle to modify a longitudinal and/or lateral force of the autonomous vehicle (e.g., a force acting on its wheels) such that the autonomous vehicle tracks the spatial path.

In some implementations, the spatial path can have a higher sampling rate than the time-based trajectory. In such implementations, the vehicle interface module can convert the time-based trajectory by determining intermediate states of the autonomous vehicle along the time-based trajectory.

In some implementations, the vehicle interface module can determine a change in conditions of the autonomous vehicle. For example, the vehicle interface module can determine a change in traction (e.g., maximum traction) available to the autonomous vehicle. Additionally or alternatively, the vehicle interface module can determine a change in vehicle dynamics capabilities of the autonomous vehicle. For example, in the case of a hybrid autonomous vehicle, the vehicle interface module can determine that limited acceleration is available because the motor and/or engine is unavailable for immediate utilization.

In some implementations, the vehicle interface module can interface a collision mitigation system of the autonomous vehicle with the vehicle controls of the autonomous vehicle. For example, the autonomous vehicle can include a collision mitigation system that determines states and conditions of the autonomous vehicle independent of the autonomy computing system. In executing a spatial path determined from data received from the autonomy computing system, the vehicle interface module can receive data from the collision mitigation system indicating that the autonomous vehicle should modify one or more of its parameters. For example, the collision mitigation system can detect that the autonomous vehicle is approaching a neighboring vehicle and should decelerate (e.g., to a velocity lower than that indicated by the autonomy computing system). Responsive to such data, the vehicle interface module can interface with low-level controls or actuators of the autonomous vehicle to modify the motion of the autonomous vehicle (e.g., such that the autonomous vehicle decelerates to avoid a possible collision with the neighboring vehicle) while still making sure that the autonomous vehicle follows the spatial path determined from the data received from the autonomy computing system. For example, if the autonomous vehicle decelerates based on data received from the collision mitigation system, the vehicle interface module can delay interfacing with controls of the autonomous vehicle associated with an impending curve in the spatial path (e.g., because it will take the autonomous vehicle longer to reach the curve given its reduced velocity).

In some implementations, the vehicle interface module can communicate, to the autonomy computing system, a change in conditions of the autonomous vehicle. For example, due to a change in road conditions (e.g., available traction) and/or vehicle dynamic capabilities, the autonomous vehicle can be delayed in reaching a state prescribed by the autonomy computing system. As a result, the autonomy computing system could continue to plan time-based trajectories for the autonomous vehicle based on inaccurate state information. Accordingly, the vehicle interface module can communicate changes in conditions of the autonomous vehicle to the autonomy computing system such that the autonomy computing system can generate future time-based trajectories based on the current state of the autonomous vehicle and/or road conditions. For example, the autonomous vehicle can detect when it approaches the traction limit, and the vehicle interface module can communicate a change (e.g., a reduction) in a friction ellipsoid associated with the autonomous vehicle to the autonomy computing system. The friction ellipsoid can define the maximum force on the tire-road interface that is available to act on the autonomous vehicle under given conditions. In some implementations, the vehicle interface module can communicate one or more constraints (e.g., a bounded linear constraint) within the friction ellipsoid. For example, as a result of the loss in traction, the autonomous vehicle actuators can have less authority to induce longitudinal and/or lateral force acting on the tires. Moreover, a portion of the available authority can be reserved for actuation in a specific direction (e.g., lateral or longitudinal), for example based on data received from the collision mitigation system. Accordingly, the vehicle interface module can communicate one or more constraints to the autonomy computing system such that the autonomy computing system can generate time-based trajectories that preserve adequate authority for the vehicle interface module to execute modifications based on data received from the collision mitigation system.

The systems and methods described herein can provide a number of technical effects and benefits. For example, the systems and methods described herein can enable an autonomous vehicle to operate based on data received from multiple independent systems (e.g., an autonomy computing system and a collision mitigation system). Additionally, the systems and methods described herein can be utilized to enable an autonomy computing system to generate trajectories for an autonomous vehicle that are based on the current state of the autonomous vehicle and preserve authority for the autonomous vehicle to execute commands based on data received from an independent system, such as a collision mitigation system provided by a third party (e.g., car manufacturer).

With reference now to the Figures, example embodiments of the present disclosure will be discussed in further detail.

Figure 1:
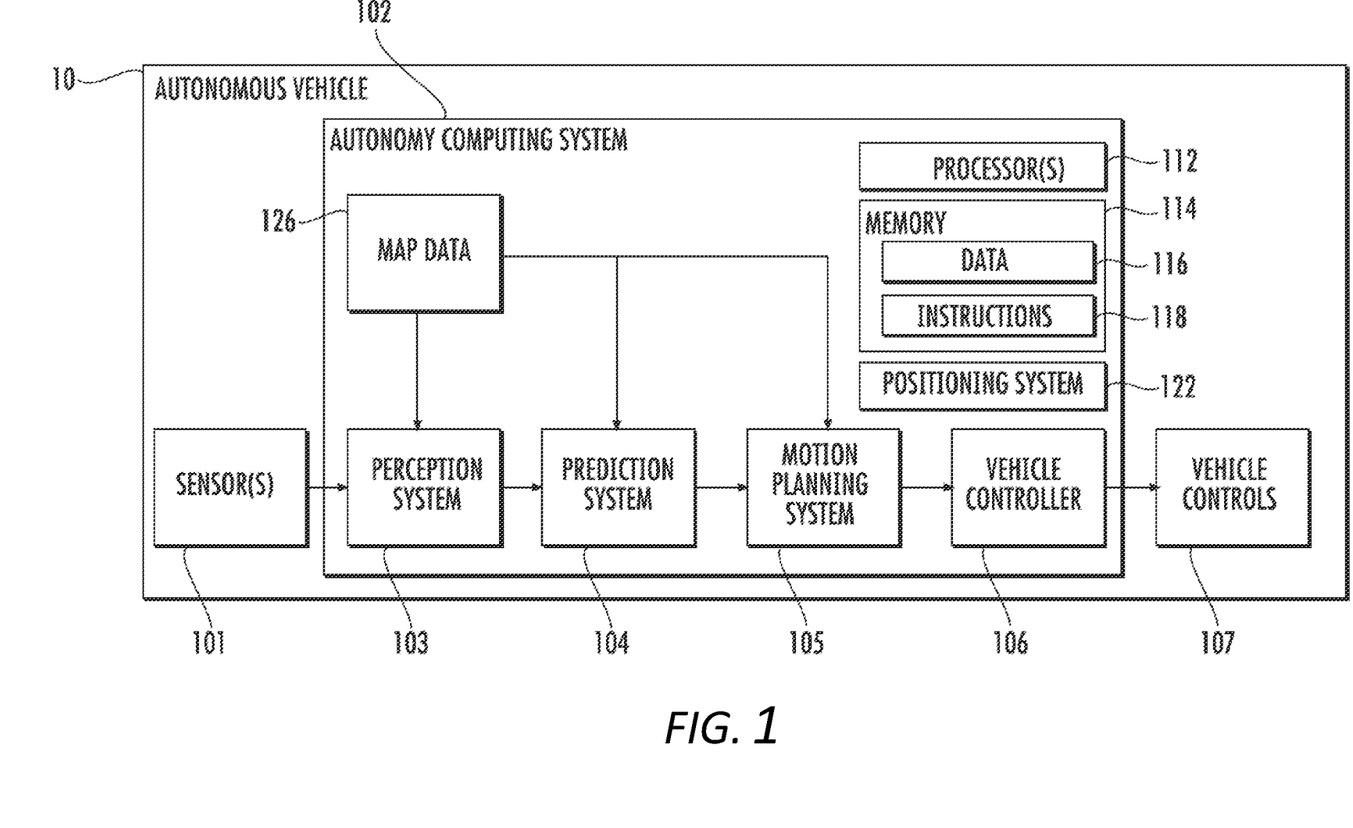
FIG. 1 depicts a block diagram of an example autonomous vehicle according to example embodiments of the present disclosure.

FIG. 1 depicts a block diagram of an example autonomous vehicle according to example embodiments of the present disclosure. Referring to FIG. 1, autonomous vehicle 10 is capable of sensing its environment and navigating without human input. Autonomous vehicle 10 can be a ground-based autonomous vehicle (e.g., car, truck, bus, etc.), an air-based autonomous vehicle (e.g., airplane, drone, helicopter, or other aircraft), or other type of vehicle (e.g., watercraft).

Autonomous vehicle 10 includes one or more sensors 101, autonomy computing system 102, and one or more vehicle controls 107. Autonomy computing system 102 can assist in controlling autonomous vehicle 10. In particular, autonomy computing system 102 can receive sensor data from sensor(s) 101, attempt to comprehend the surrounding environment by performing various processing techniques on data collected by sensor(s) 101, and generate an appropriate motion path through such surrounding environment. Autonomy computing system 102 can control vehicle control(s) 107 to operate autonomous vehicle 10 according to the motion path.

Autonomy computing system 102 includes one or more processors 112 and memory 114. Processor(s) 112 can be any suitable processing device (e.g., a processor core, a microprocessor, an application-specific integrated circuit (ASIC), a field-programmable gate array (FPGA), a controller, a microcontroller, etc.) and can be one processor or a plurality of processors that are operatively connected. Memory 114 can include one or more non-transitory computer-readable storage media, such as random-access memory (RAM), read-only memory (ROM), electrically erasable programmable read-only memory (EEPROM), erasable programmable read-only memory (EPROM), one or more memory devices, flash memory devices, etc., and combinations thereof.

Memory 114 can store information that can be accessed by processor(s) 112. For instance, memory 114 (e.g., one or more non-transitory computer-readable storage mediums, memory devices, or the like) can store data 116 that can be obtained, received, accessed, written, manipulated, created, and/or stored. In some implementations, computing system 102 can obtain data from one or more memory device(s) that are remote from system 102.

Memory 114 can also store computer-readable instructions 118 that can be executed by processor(s) 112. Instructions 118 can be software written in any suitable programming language or can be implemented in hardware. Additionally or alternatively, instructions 118 can be executed in logically and/or virtually separate threads on processor(s) 112.

For example, memory 114 can store instructions 118 that when executed by processor(s) 112 cause processor(s) 112 to perform any of the operations and/or functions described herein.

In some implementations, autonomy computing system 102 can further include positioning system 122. Positioning system 122 can determine a current position of vehicle 10. Positioning system 122 can be any device or circuitry for analyzing the position of vehicle 10. For example, positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of vehicle 10 can be used by various systems of autonomy computing system 102.

Autonomy computing system 102 can include perception system 103, prediction system 104, and motion planning system 105 that cooperate to perceive the dynamic surrounding environment of autonomous vehicle 10 and determine a motion plan for controlling the motion of autonomous vehicle 10 accordingly.

In particular, in some implementations, perception system 103 can receive sensor data from sensor(s) 101 that are coupled to or otherwise included within autonomous vehicle 10. As examples, sensor(s) 101 can include a light detection and ranging (LIDAR) system, a radio detection and ranging (RADAR) system, one or more cameras (e.g., visible spectrum cameras, infrared cameras, etc.), and/or other sensors. The sensor data can include information that describes the location and/or velocity vector of objects within the surrounding environment of autonomous vehicle 10.

As one example, for a LIDAR system, the sensor data can include the relative location (e.g., in three-dimensional space relative to the LIDAR system) of a number of points that correspond to objects that have reflected a ranging laser. For example, a LIDAR system can measure distances by measuring the interference between outgoing and incoming light waves and by measuring the time of flight (TOF) that it takes a short laser pulse to travel from the sensor to an object and back, calculating the distance based on the TOF with the known speed of light, and based on the phase-shift with known wave-length.

As another example, for a RADAR system, the sensor data can include the relative location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, sensor(s) 101 can be used to collect sensor data that includes information that describes the location (e.g., in three-dimensional space relative to autonomous vehicle 10) of points that correspond to objects within the surrounding environment of the autonomous vehicle 10.

In addition to the sensor data, perception system 103 can retrieve or otherwise obtain map data 126 that provides detailed information about the surrounding environment of autonomous vehicle 10. Map data 126 can provide information regarding: the identity and location of different travelways (e.g., roadways), road segments, buildings, or other static items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists computing system 102 in comprehending and perceiving its surrounding environment and its relationship thereto.

Perception system 103 can identify one or more objects that are proximate to autonomous vehicle 10 based on sensor data received from sensor(s) 101 and/or map data 126. In particular, in some implementations, perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, perception system 103 can determine state data for each object over a number of iterations. In particular, perception system 103 can update the state data for each object at each iteration. Thus, perception system 103 can detect and track objects (e.g., vehicles) that are proximate to autonomous vehicle 10 over time.

Prediction system 104 can receive the state data from perception system 103 and predict one or more future locations for each object based on such state data. For example, prediction system 104 can predict where each object will be located within the next five seconds, ten seconds, twenty seconds, etc. As one example, an object can be predicted to adhere to its current trajectory according to its current speed. As another example, other, more sophisticated prediction techniques or modeling can be used.

Motion planning system 105 can determine a motion plan for autonomous vehicle 10 based at least in part on the predicted one or more future locations of the objects and/or the state data of the objects provided by perception system 103. Stated differently, given information about the current locations of objects and/or predicted future locations of proximate objects, motion planning system 105 can determine a motion plan for autonomous vehicle 10 that best navigates autonomous vehicle 10 relative to the objects at such locations. Motion planning system 105 can provide the selected motion plan to vehicle controller 106 that directly and/or indirectly controls one or more vehicle actuators via the vehicle controls 107 (e.g., actuators or other devices that control gas flow, steering, braking, etc.) to execute the selected motion plan.

Each of perception system 103, prediction system 104, motion planning system 105, and vehicle controller 106 can include computer logic utilized to provide desired functionality. In some implementations, each of perception system 103, prediction system 104, motion planning system 105, and vehicle controller 106 can be implemented in hardware, firmware, and/or software controlling a general purpose processor. For example, in some implementations, each of perception system 103, prediction system 104, motion planning system 105, and vehicle controller 106 includes program files stored on a storage device, loaded into a memory and executed by one or more processors. In other implementations, each of perception system 103, prediction system 104, motion planning system 105, and vehicle controller 106 includes one or more sets of computer-executable instructions stored in a tangible computer-readable storage medium such as RAM, hard disk, or optical or magnetic media.

Figure 2:
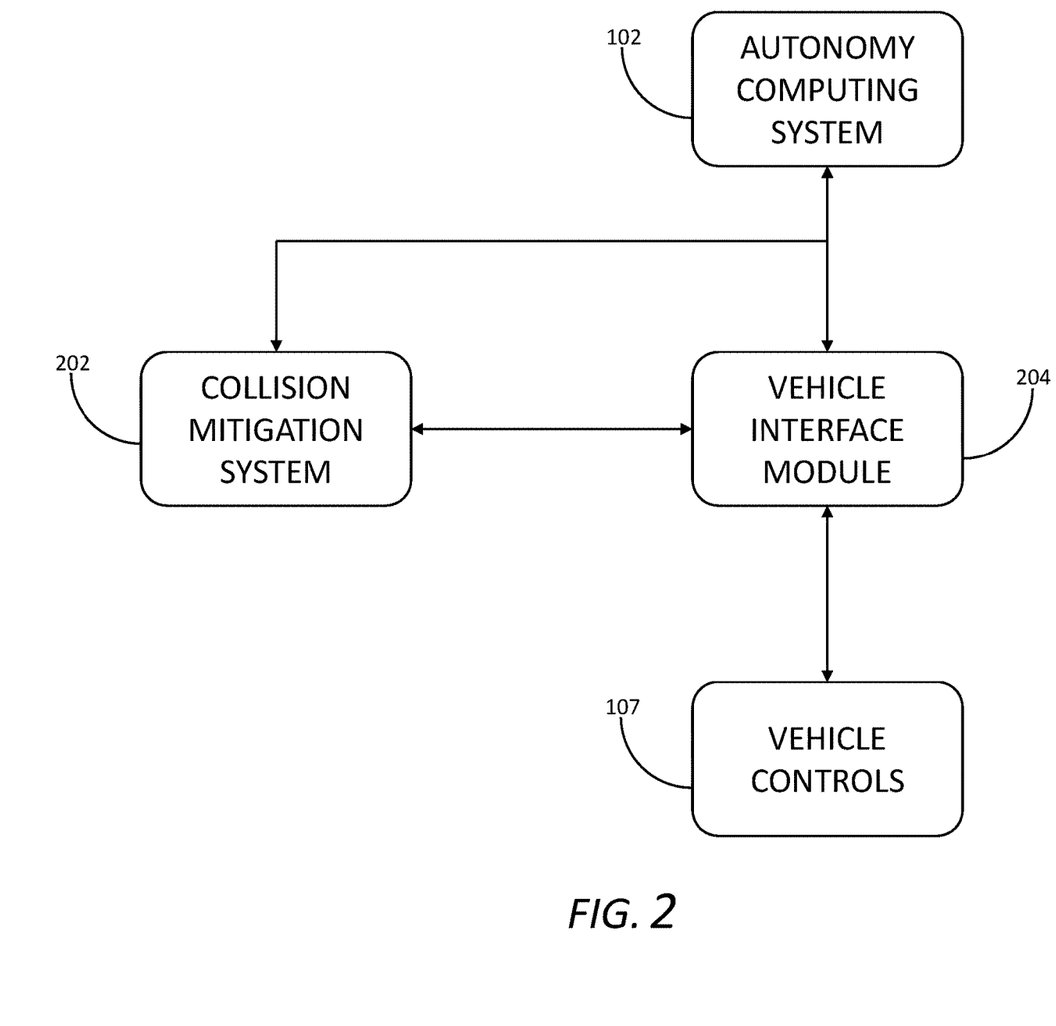
FIG. 2 depicts a block diagram of an example vehicle interface module according to example embodiments of the present disclosure.

FIG. 2 depicts a block diagram of an example vehicle interface module according to example embodiments of the present disclosure. Referring to FIG. 2, vehicle interface module 204 can interface collision mitigation system 202 and autonomy computing system 102 with vehicle controls 107. Vehicle interface module 204 can include circuitry configured to perform one or more operations and/or functions described herein. For example, vehicle interface module 204 can be configured to receive data indicating a motion plan from autonomy computing system 102 (e.g., data generated by motion planning system 105). The data can indicate a time-based trajectory for autonomous vehicle 10. Responsive to receiving the data indicating the time-based trajectory for autonomous vehicle 10, vehicle interface module 204 can verify that execution of the time-based trajectory is within parameters of autonomous vehicle 10. For example, vehicle interface module 204 can determine whether autonomous vehicle 10 can execute (or track) the time-based trajectory based on inherent capabilities of autonomous vehicle 10, current conditions (e.g., available traction), and/or vehicle dynamics capabilities (e.g., in the case of a hybrid vehicle, whether the engine and/or motor is immediately available), or the like.

Responsive to verifying that execution of the time-based trajectory is within the parameters of autonomous vehicle 10, vehicle interface module 204 can convert the time-based trajectory into a spatial path for autonomous vehicle 10 and can interface with vehicle controls 107 such that autonomous vehicle 10 tracks the spatial path. In some implementations, vehicle controller 106 can run at a higher sampling rate than that specified in the time-based trajectory. In such implementations, vehicle interface module 204 can convert the time-based trajectory by determining intermediate states of autonomous vehicle 10 along the time-based trajectory (e.g., states between the samples of the time-based trajectory). Interfacing with vehicle controls 107 can include modifying a longitudinal and/or lateral force of autonomous vehicle 10, for example, by causing an engine and/or motor of autonomous vehicle 10 to be engaged and/or accelerated or decelerated, causing brakes to be applied to one or more wheels of autonomous vehicle 10, and/or causing the position of one or more wheels of autonomous vehicle 10 to be modified.

In some implementations, vehicle interface module 204 can determine a change in conditions of autonomous vehicle 10. For example, vehicle interface module 204 can determine that there is a change in traction available to autonomous vehicle 10 (e.g., due to a change in road conditions) and/or that there is a change in vehicle dynamics capabilities of autonomous vehicle 10. Additionally or alternatively, vehicle interface module 204 can determine a change in conditions based on data received from collision mitigation system 202. Collision mitigation system 202 can be a system of autonomous vehicle 10 that is different and separate from autonomy computing system 102 and configured to control autonomous vehicle 10 based on determinations it makes regarding the environment of autonomous vehicle 10. For example, collision mitigation system 202 can include original equipment manufacturer (OEM) hardware of autonomous vehicle 10 configured to control autonomous vehicle 10 such that autonomous vehicle 10 avoids collisions with other vehicles or objects.

As indicated above, vehicle interface module 204 can interface autonomy computing system 102 and collision mitigation system 202 with vehicle controls 107. Accordingly, vehicle interface module 204 can be configured to receive data from autonomy computing system 102 and collision mitigation system 202 indicating various and possibly conflicting trajectories, velocities, or the like for autonomous vehicle 10 and determine a single (e.g., best, safest, most conservative, or the like) course of action for autonomous vehicle 10. For example, vehicle interface module 204 can receive data from autonomy computing system 102 indicating a first velocity and/or acceleration for autonomous vehicle 10, receive data from collision mitigation system 202 indicating a second velocity and/or acceleration for autonomous vehicle 10, and determine to interface with vehicle controls 107 such that autonomous vehicle 10 achieves the slower of the two velocities (e.g., corresponding to the accelerations and initial velocities).

Figure 3:
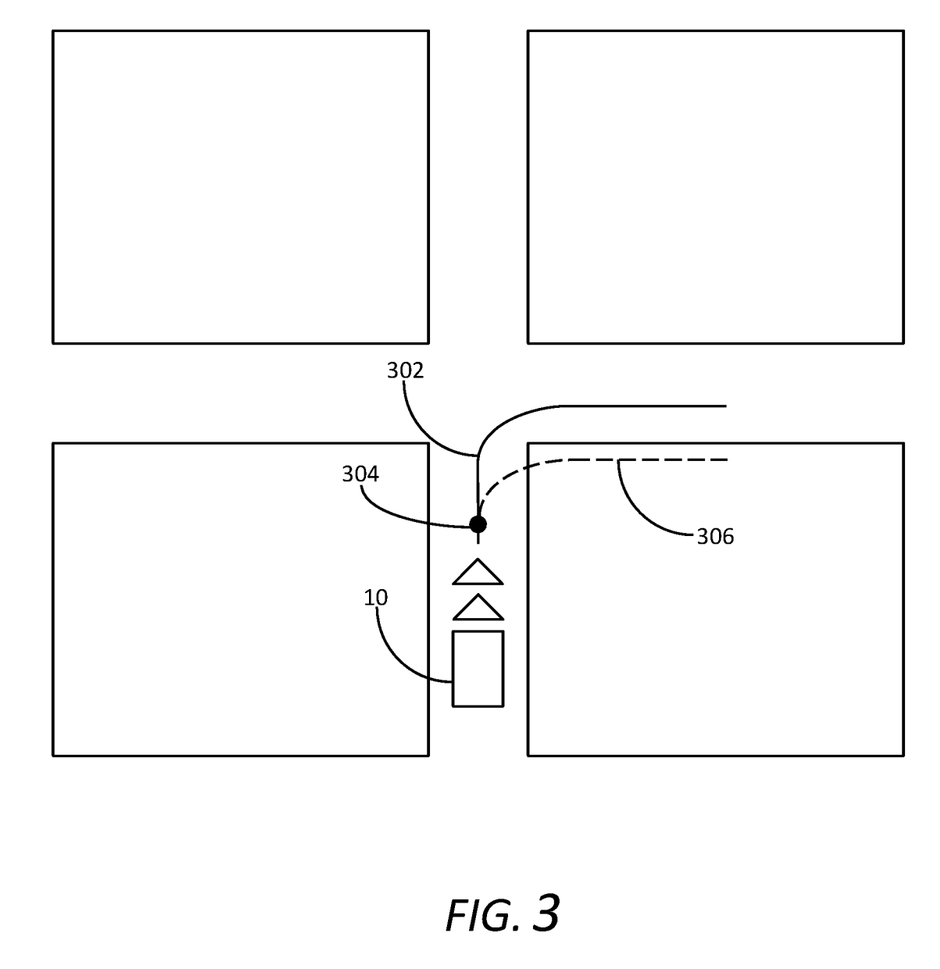
FIG. 3 depicts example trajectories of an autonomous vehicle according to example embodiments of the present disclosure.

It will be appreciated that when vehicle interface module 204 interfaces with vehicle controls 107 based on a change in conditions, it can alter the position of autonomous vehicle 10 on a trajectory determined by autonomy computing system 102. For example, FIG. 3 depicts example trajectories of an autonomous vehicle according to example embodiments of the present disclosure. Referring to FIG. 3, trajectory 302 can enable autonomous vehicle 10 to successfully traverse its environment en route to its destination. Autonomy computing system 102 can determine a time-based trajectory that enables autonomous vehicle 10 to follow trajectory 302 and can communicate data indicating the time-based based trajectory to vehicle interface module 204. Vehicle interface module 204 can verify that execution of the time-based trajectory is within parameters of autonomous vehicle 10, convert the time-based trajectory into a spatial path that enables autonomous vehicle 10 to follow trajectory 302, and interface with vehicle controls 107 such that autonomous vehicle 10 tracks the spatial path.

At point 304, vehicle interface module 204 can determine a change in conditions of autonomous vehicle 10. For example, the vehicle, due to a temporary limitation in propulsive force, may effectively travel along the trajectory at a lower then planned velocity. It will be appreciated, that if autonomous vehicle 10 continues to execute feedforward commands based on the time-based trajectory determined by autonomy computing system 102, autonomous vehicle 10 will follow trajectory 306, rather than trajectory 302 and important feedback action can be required to keep the vehicle close to trajectory 302. Accordingly, vehicle interface module 204 can interface with vehicle controls 107 based on the modifications in the longitudinal and/or lateral force such that autonomous vehicle 10 continues to track trajectory 302 (e.g., by delaying execution of the turn).

Figure 4:
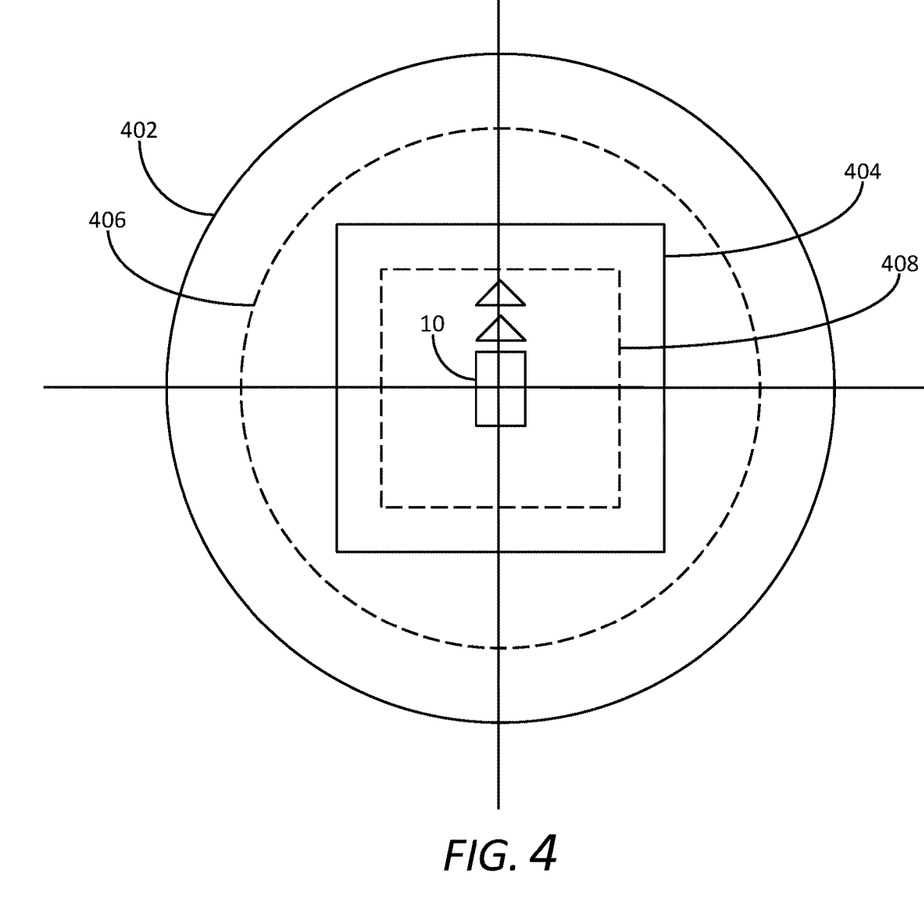
FIG. 4 depicts example friction ellipsoids of an autonomous vehicle according to example embodiments of the present disclosure.

In some implementations, vehicle interface module 204 can communicate the change in conditions of autonomous vehicle 10 to autonomy computing system 102. For example, vehicle interface module 204 can communicate that there is a change in traction available to autonomous vehicle 10 (e.g., due to a change in road conditions) and/or that there is a change in vehicle dynamics capabilities of autonomous vehicle 10. In some implementations, the change in conditions can result in a change (e.g., a reduction) in a friction ellipsoid associated with autonomous vehicle 10. For example, FIG. 4 depicts example friction ellipsoids of an autonomous vehicle according to example embodiments of the present disclosure. Referring to FIG. 4, prior to a change in conditions of autonomous vehicle 10, friction ellipsoid 402 can represent the authority available to autonomous vehicle 10 (e.g., to exert longitudinal and/or lateral force on the vehicle via the contact patch of the tire). When friction ellipsoid 402 represents the authority available to autonomous vehicle 10, autonomy computing system 102 can be configured to operate within one or more constraints 404, thereby reserving a portion of the authority represented by friction ellipsoid 402 for use by vehicle interface module 204 to modify a longitudinal and/or lateral force of autonomous vehicle 10 in response to a change in conditions (e.g., based on data received from collision mitigation system 202).

When a change in conditions occurs (e.g., a change in available traction, a change in vehicle dynamics capabilities, and/or a longitudinal and/or lateral force of autonomous vehicle 10 is modified (e.g., based on data received from collision mitigation system 202), or the like), the authority available to autonomous vehicle 10 can be reduced, and friction ellipsoid 406 can represent the authority available to autonomous vehicle 10. In such implementations, communicating the change in conditions to autonomy computing system 102 can include communicating one or more constraints (e.g., a bounded linear constraint) within the reduced friction ellipsoid. For example, vehicle interface module 204 can communicate one or more constraints 408 to autonomy computing system 102, such that autonomy computing system 102 can reconfigure itself to reserve a portion of the authority represented by friction ellipsoid 406 for use by vehicle interface module 204 to modify a longitudinal and/or lateral force of autonomous vehicle 10 in response to a subsequent change in conditions. In some implementations, constraint(s) 408 can be determined based on one or more parameters associated with collision mitigation system 202. For example, constraint(s) 408 can be determined such that authority within friction ellipsoid 406 is reserved for use by vehicle interface module 204 to modify a longitudinal and/or lateral force of autonomous vehicle 10 in response to data received from collision mitigation system 202 (e.g., to apply the brakes in order to avoid an object detected by collision mitigation system 202).

Figure 5:
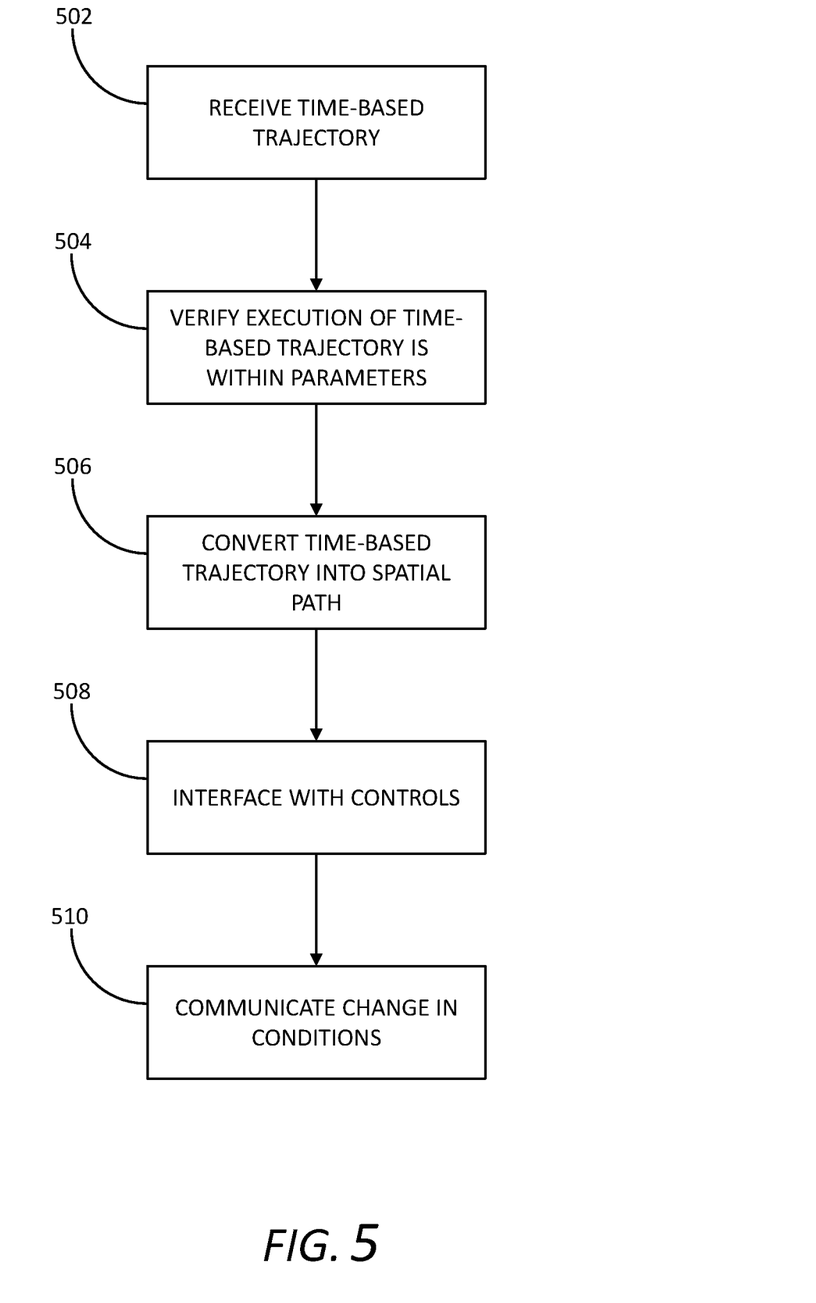
FIG. 5 depicts a flow chart diagram of an example method to operate an autonomous vehicle according to example embodiments of the present disclosure.

FIG. 5 depicts a flow chart diagram of an example method to operate an autonomous vehicle according to example embodiments of the present disclosure. Referring to FIG. 5, at (502), a time-based trajectory for an autonomous vehicle can be received. For example, vehicle interface module 204 can receive data indicating a time-based trajectory for autonomous vehicle 10 corresponding to trajectory 302 from autonomy computing system 102. At (504), whether execution of the time-based trajectory is within parameters of the autonomous vehicle can be verified. For example, vehicle interface module 204 can verify that execution of the time-based trajectory corresponding to trajectory 302 is within parameters of autonomous vehicle 10. At (506), the time-based trajectory for the autonomous vehicle can be converted into a spatial path for the autonomous vehicle. For example, vehicle interface module 204 can convert the time-based trajectory corresponding to trajectory 302 into a spatial path for autonomous vehicle 10 corresponding to trajectory 302. At (508), controls of the autonomous vehicle can be interfaced such that the autonomous vehicle tracks the spatial path. For example, vehicle interface module 204 can interface with vehicle controls 107 such that autonomous vehicle 10 tracks the spatial path corresponding to trajectory 302. At (510), a change in conditions can be communicated. For example, vehicle interface module 204 can communicate data to autonomy computing system 102 indicating a change in conditions (e.g., a change in available traction, a change in vehicle dynamics capabilities, and/or that a longitudinal and/or lateral force of autonomous vehicle 10 has been modified (e.g., based on data received from collision mitigation system 202), or the like).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to operate an autonomous vehicle, the method comprising:
responsive to receiving, at a vehicle controller comprising one or more computing devices and from an autonomy computing system that is separate from the vehicle controller, a time-based trajectory for the autonomous vehicle, verifying, by the vehicle controller, that execution of the time-based trajectory is within parameters of the autonomous vehicle; and responsive to verifying, by the vehicle controller, that execution of the time-based trajectory is within the parameters of the autonomous vehicle:
converting, by the vehicle controller, the time-based trajectory into a spatial path for the autonomous vehicle, the spatial path having a higher sampling rate than the time-based trajectory;
interfacing, by the vehicle controller, with one or more controls of the autonomous vehicle such that the autonomous vehicle tracks the spatial path;
communicating, by the vehicle controller and to the autonomy computing system of the autonomous vehicle, a change in conditions of the autonomous vehicle; and
responsive to receiving the change in conditions at the autonomy computing system, constraining, by the autonomy computing system, operation of the autonomous vehicle to within an operational constraint defined with respect to a friction ellipsoid, and wherein the operational constraint is defined within the friction ellipsoid such that a portion of an authority represented by the friction ellipsoid that is outside of the operational constraint is reserved.

2. The computer-implemented method of claim 1, wherein converting the time-based trajectory comprises determining a plurality of intermediate states of the autonomous vehicle along the time-based trajectory.

3. The computer-implemented method of claim 1, wherein interfacing with the one or more controls of the autonomous vehicle comprises, responsive to determining a change in conditions of the autonomous vehicle, modifying one or more of a longitudinal or lateral force of the autonomous vehicle.

4. The computer implemented method of claim 3, wherein determining the change in conditions comprises determining a change in traction of the autonomous vehicle.

5. The computer implemented method of claim 3, wherein determining the change in conditions comprises determining the change in conditions based on data received from a collision mitigation system of the autonomous vehicle, wherein the collision mitigation system provides an independent path of determining desirable vehicle motion in parallel to a primary path in the autonomy computing system.

6. The computer-implemented method of claim 3, wherein interfacing with the one or more controls of the autonomous vehicle comprises interfacing with the one or more controls based on modifications in the one or more of the longitudinal or lateral force such that the autonomous vehicle continues to track the spatial path.

7. The computer-implemented method of claim 1, further comprising communicating, to the autonomy computing system of the autonomous vehicle, a change in conditions of the autonomous vehicle.

8. The computer-implemented method of claim 7, wherein the change in conditions comprises a change in road conditions.

9. The computer-implemented method of claim 7, wherein the change in conditions comprises a change in vehicle dynamics capabilities of the autonomous vehicle.

10. The computer-implemented method of claim 1, further comprising defining the operational constraint with respect to the friction ellipsoid based on one or more parameters associated with a collision mitigation system of the autonomous vehicle.

11. A computing system comprising:
a vehicle controller comprising circuitry; and
an autonomy computing system that is separate from the vehicle controller;
wherein the computing system is configured to:
responsive to receiving, by the circuitry of the vehicle controller and from the autonomy computing system that is separate from the vehicle controller, a time-based trajectory for an autonomous vehicle, verify, by the circuitry of the vehicle controller, that execution of the time-based trajectory is within parameters of the autonomous vehicle; and
responsive to verifying, by the circuitry of the vehicle controller, that execution of the time-based trajectory is within the parameters of the autonomous vehicle:
convert, by the circuitry of the vehicle controller, the time-based trajectory into a spatial path for the autonomous vehicle, the spatial path having a higher sampling rate than the time-based trajectory;
interface, by the circuitry of the vehicle controller, with one or more controls of the autonomous vehicle such that the autonomous vehicle tracks the spatial path;
communicate, by the circuitry of the vehicle controller and to the autonomy computing system, a change in conditions of the autonomous vehicle; and
responsive to receiving the change in conditions at the autonomy computing system, constrain by the autonomy computing system, operation of the autonomous vehicle to within an operational constraint defined with respect to a friction ellipsoid, and wherein the operational constraint is defined within the friction ellipsoid such that a portion of an authority represented by the friction ellipsoid that is outside of the operational constraint is reserved.

12. The computing system of claim 11, further comprising determining the change in conditions based on a change in traction of the autonomous vehicle.

13. The computing system vehicle controller of claim 11, further comprising determining the change in conditions based on data received from a collision mitigation system of the autonomous vehicle, wherein the collision mitigation system is different and separate from the autonomy computing system.

14. The computing system of claim 11, wherein the circuitry is configured to interface with the one or more controls based on modifications in the one or more of the longitudinal or lateral force such that the autonomous vehicle continues to track the spatial path.

15. An autonomous vehicle comprising circuitry configured to:
responsive to receiving, at a vehicle controller comprising one or more computing devices and from an autonomy computing system that is separate from the vehicle controller, a time-based trajectory for the autonomous vehicle, verify, by the vehicle controller, that execution of the time-based trajectory is within parameters of the autonomous vehicle; and
responsive to verifying, by the vehicle controller, that execution of the time-based trajectory is within the parameters of the autonomous vehicle:
convert, by the vehicle controller, the time-based trajectory into a spatial path for the autonomous vehicle, the spatial path having a higher sampling rate than the time-based trajectory;

interface, by the vehicle controller, with one or more controls of the autonomous vehicle such that the autonomous vehicle tracks the spatial path, the spatial path having a higher sampling rate than the time-based trajectory; and communicate, by the vehicle controller and to the autonomy computing system of the autonomous vehicle, a change in conditions of the autonomous vehicle; and responsive to receiving the change in conditions at the autonomy computing system, constrain, by the autonomy computing system, operation of the autonomous vehicle to within an operational constraint defined with respect to a friction ellipsoid, and wherein the operational constraint is defined within the friction ellipsoid such that a portion of an authority represented by the friction ellipsoid that is outside of the operational constraint is reserved.

* * * * *